(12) United States Patent
Stevens et al.

(10) Patent No.: US 12,543,815 B2
(45) Date of Patent: Feb. 10, 2026

(54) WIRELESS CHARGING ASSEMBLIES FOR SENSORIZED INSOLES, METHODS FOR CHARGING SENSORIZED INSOLES, AND FOOTWEAR SYSTEMS INCLUDING SENSORIZED INSOLES

(71) Applicant: ORPYX MEDICAL TECHNOLOGIES INC., Calgary (CA)

(72) Inventors: Travis Michael Stevens, Calgary (CA); Sanjay Gupta, Bedford, MA (US); Samuel Carl William Blades, Victoria (CA); Cory David Paddock, Calgary (CA); Patrick Dobbie, Calgary (CA); Jeffrey Thompson Knight, Austin, TX (US)

(73) Assignee: ORPYX MEDICAL TECHNOLOGIES INC., Calgary (CA)

( * ) Notice: Subject to any disclaimer, the term of this patent is extended or adjusted under 35 U.S.C. 154(b) by 0 days.

(21) Appl. No.: 18/826,330

(22) Filed: Sep. 6, 2024

(65) Prior Publication Data

US 2024/0423315 A1 Dec. 26, 2024

Related U.S. Application Data

(63) Continuation of application No. 18/062,063, filed on Dec. 6, 2022, now Pat. No. 12,108,836.

(30) Foreign Application Priority Data

Sep. 27, 2022 (CA) ..................... 3175982

(51) Int. Cl.
A43B 3/40 (2022.01)
H02J 50/00 (2016.01)
(Continued)

(52) U.S. Cl.
CPC .............. *A43B 3/40* (2022.01); *H02J 50/005* (2020.01); *H02J 50/10* (2016.02); *H02J 50/40* (2016.02); *H02J 50/70* (2016.02); *H02J 50/90* (2016.02)

(58) Field of Classification Search
CPC . A43B 3/40; H02J 50/005; H02J 50/10; H02J 50/40; H02J 50/70; H02J 50/90
(Continued)

(56) References Cited

U.S. PATENT DOCUMENTS 7,510,293 B2 3/2009 Chyn
7,794,101 B2 9/2010 Galica et al.
(Continued)

FOREIGN PATENT DOCUMENTS

CN 111869992 A 11/2020
KR 100937627 B1 1/2010
(Continued)

OTHER PUBLICATIONS

C. Liu, C. Jiang, J. Song and K. T. Chau, "An Effective Sandwiched Wireless Power Transfer System for Charging Implantable Cardiac Pacemaker," in IEEE Transactions on Industrial Electronics, vol. 66, No. 5, pp. 4108-4117, May 2019, doi: 10.1109/TIE.2018.2840522.
(Continued)

*Primary Examiner* — Hal Kaplan
(74) *Attorney, Agent, or Firm* — ABM INTELLECTUAL PROPERTY INC.; Adrienne Bieber McNeil

(57) ABSTRACT

A footwear system includes a sensorized insole, a wireless charging transmitter pod, and a wireless charging mat. The insole has an insole bulk having a foot-facing upper surface and a ground-facing lower surface. One or more sensors, one or more batteries, and a wireless charging receiver pod are embedded in the insole bulk. The transmitter pod receives energy and wirelessly transmits energy to the receiver pod.
(Continued)

The transmitter pod is positionable against the foot-facing upper surface to wirelessly provide energy to the receiver pod through the insole bulk. The mat receives energy and wirelessly transmits energy to the receiver pod. The mat is positionable adjacent the ground-facing lower surface to wirelessly provide energy to the receiver pod through the first insole bulk. The system is configured to allow only one of the transmitter pod and the mat to provide energy to the receiver pod at a given time.

20 Claims, 7 Drawing Sheets

Related U.S. Application Data

(60) Provisional application No. 63/290,247, filed on Dec. 16, 2021.

(51) Int. Cl.
*H02J 50/10* (2016.01)
*H02J 50/40* (2016.01)
*H02J 50/70* (2016.01)
*H02J 50/90* (2016.01)

(58) Field of Classification Search
USPC .......................................................... 307/104
See application file for complete search history.

(56) References Cited

U.S. PATENT DOCUMENTS

| | | | |
|---|---|---|---|
| 8,058,837 B2 | 11/2011 | Beers et al. | |
| 10,004,428 B2 | 6/2018 | Everett et al. | |
| 10,020,683 B2 | 7/2018 | Carobolante et al. | |
| 10,886,771 B2 | 1/2021 | Kasar et al. | |
| 11,689,056 B2 | 6/2023 | Bhat et al. | |
| 11,700,904 B2 | 7/2023 | Stevens et al. | |
| 11,764,617 B2 | 9/2023 | Melone et al. | |
| 11,791,665 B2 | 10/2023 | Bhandarkar | |
| 2012/0186101 A1 | 7/2012 | Sanchez | |
| 2014/0197693 A1 | 7/2014 | Fujita et al. | |
| 2014/0327320 A1 | 11/2014 | Muhs et al. | |
| 2014/0354218 A1 | 12/2014 | Kaynar et al. | |
| 2015/0326028 A1 | 11/2015 | Suzuki et al. | |
| 2016/0101291 A1 | 4/2016 | Jaax et al. | |
| 2016/0156388 A1 | 6/2016 | Zeine et al. | |
| 2016/0181870 A1 | 6/2016 | Bae | |
| 2017/0150773 A1 | 6/2017 | Beers | |
| 2017/0201130 A1 | 7/2017 | Park | |
| 2018/0034305 A1 | 2/2018 | Lee et al. | |
| 2018/0115185 A1 | 4/2018 | John | |
| 2020/0021896 A1 | 1/2020 | Fitzgerald et al. | |
| 2020/0060378 A1 | 2/2020 | Roh et al. | |
| 2020/0253320 A1 | 8/2020 | Guard et al. | |
| 2020/0390369 A1 | 12/2020 | Sandler et al. | |
| 2022/0053874 A1 | 2/2022 | Beers | |

FOREIGN PATENT DOCUMENTS

| | | |
|---|---|---|
| KR | 101315540 B1 | 10/2013 |
| WO | 2021092676 A1 | 5/2021 |

OTHER PUBLICATIONS

Ku, H. & Kong, P.. (2016). Efficiency optimising scheme for wireless power transfer system with two transmitters. Electronics Letters. 52. 10.1049/el.2015.3736.
Noh, Eonsu & Kim, Kangwook & Ko, Kwang. (2016). Transmitter coil system without ferrite in wireless power transfer. Electronics Letters. 52. 10.1049/el.2015.3820.
Notice of Allowance issued on Jun. 18, 2024 in U.S. Appl. No. 18/062,063.
Office Action issued in Canadian patent application No. 3175982 on Feb. 21, 2024.
Office Action issued on Apr. 9, 2024 in U.S. Appl. No. 18/062,063.
SEMTECH Wireless Charging User Guide TSWIRX-5V2-EVM Low Power Wireless Charging Receiver (Rev 3.00), 2015.
SEMTECH Wireless Charging User Guide TSWITX-G4-EVM Wireless Charging Transmitter, 2015.

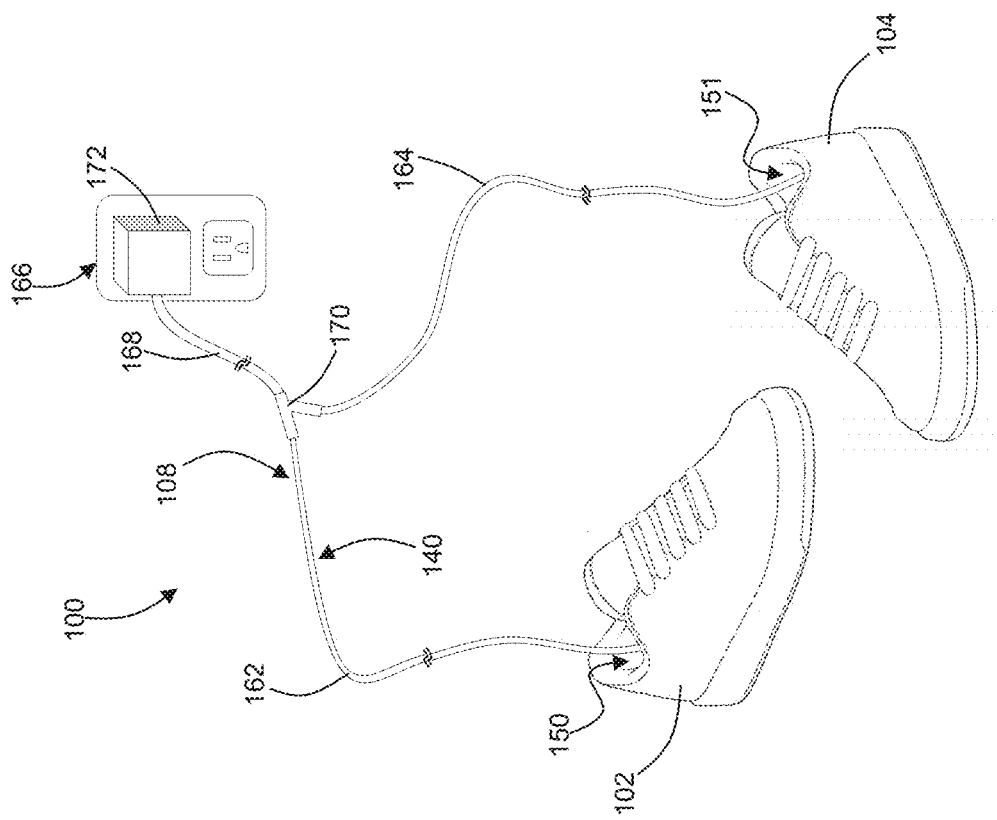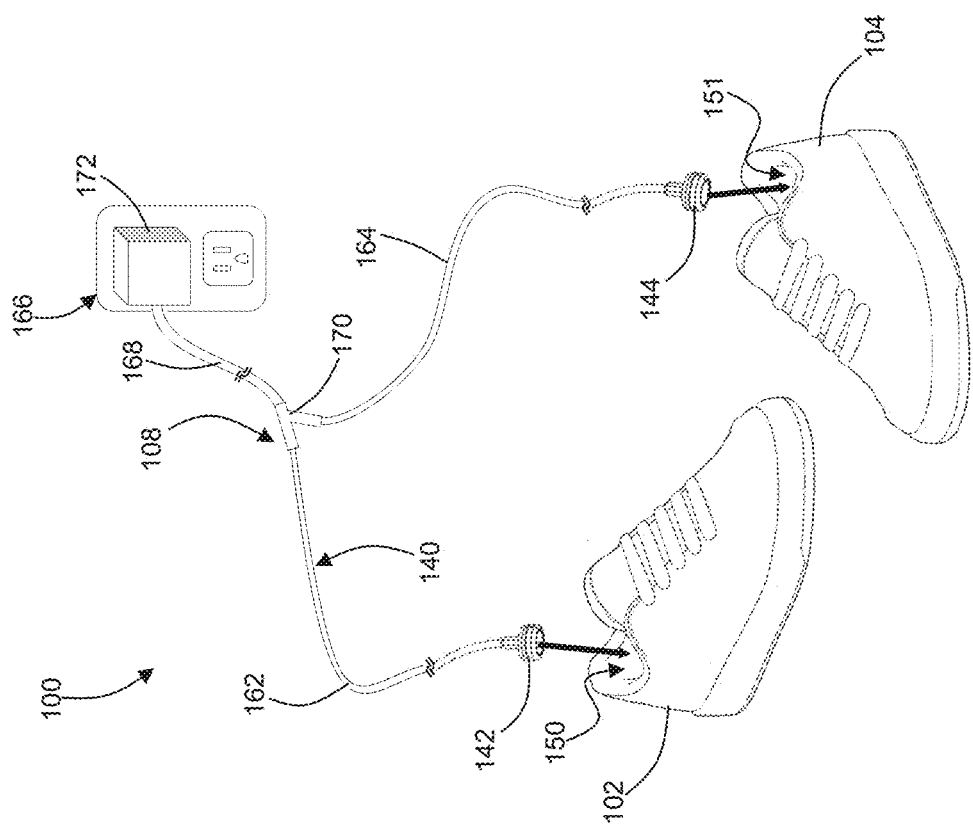

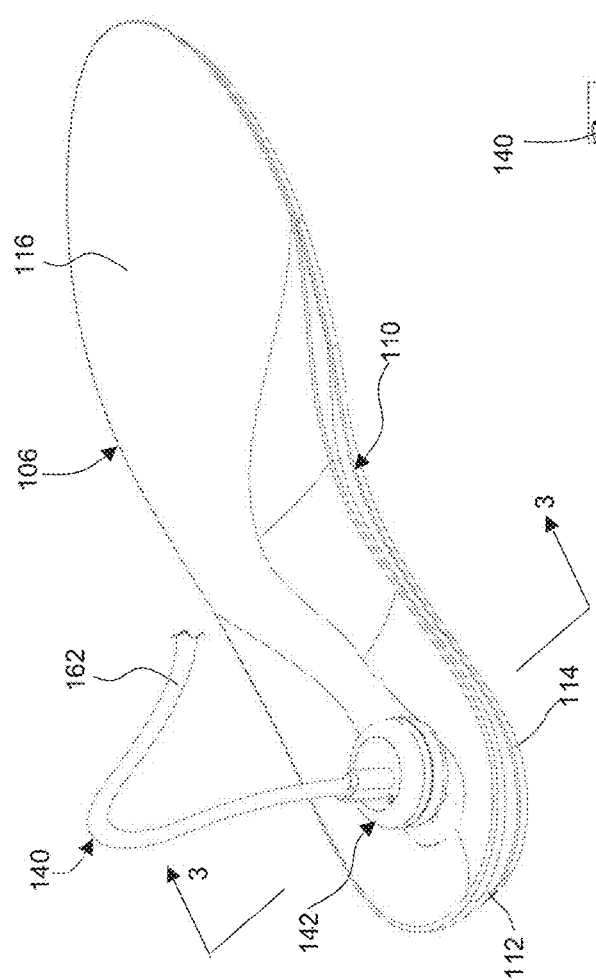
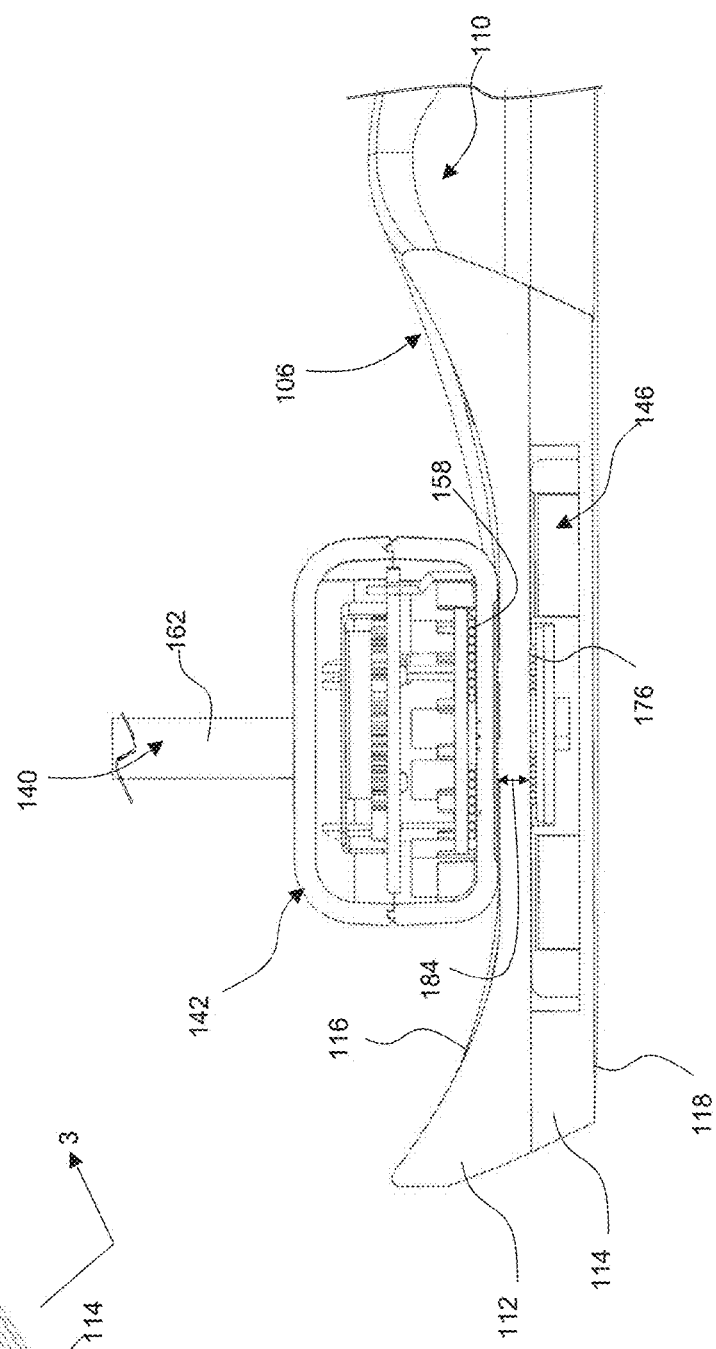

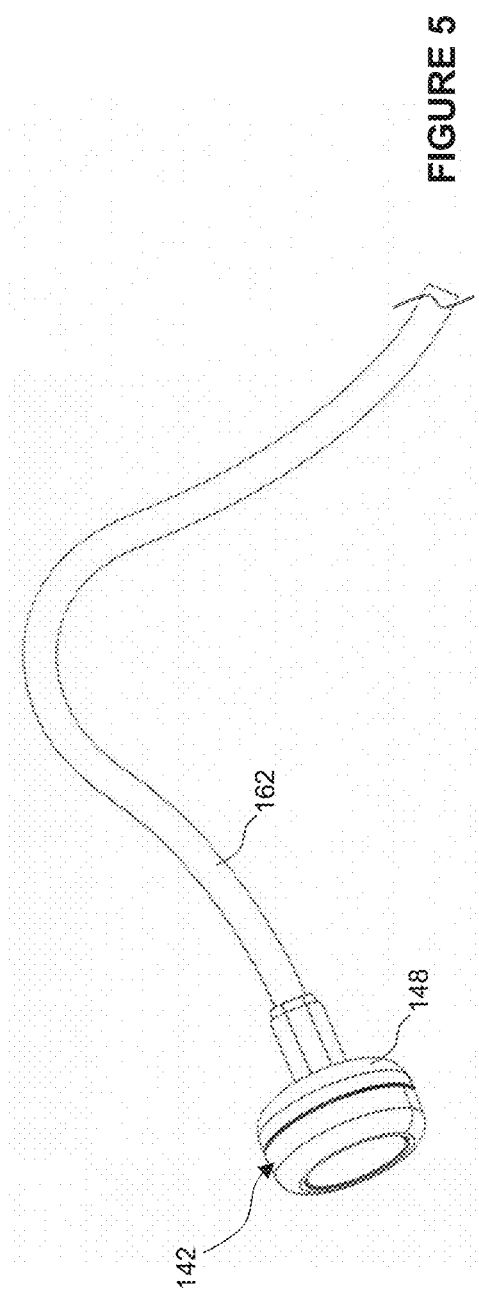
FIGURE 5
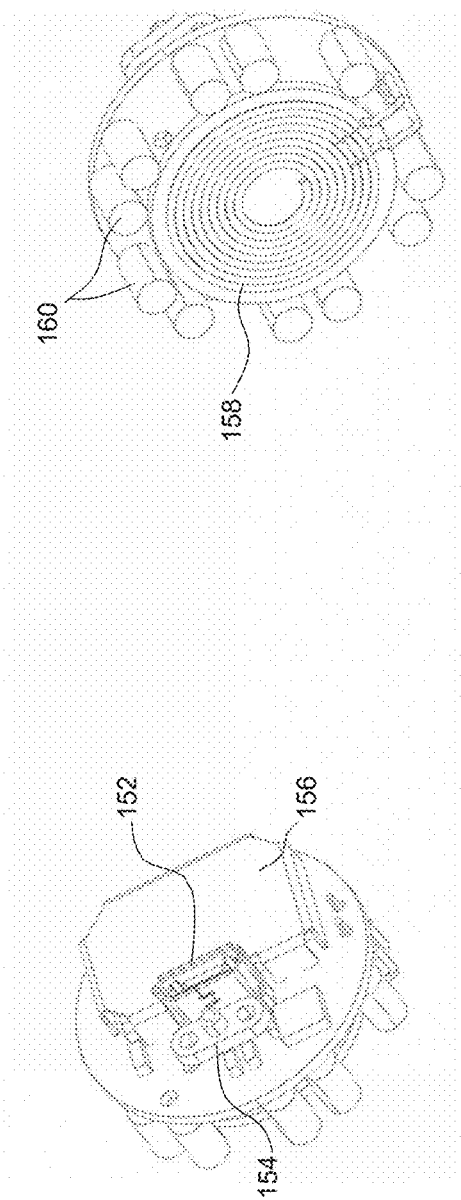
FIGURE 6
FIGURE 7

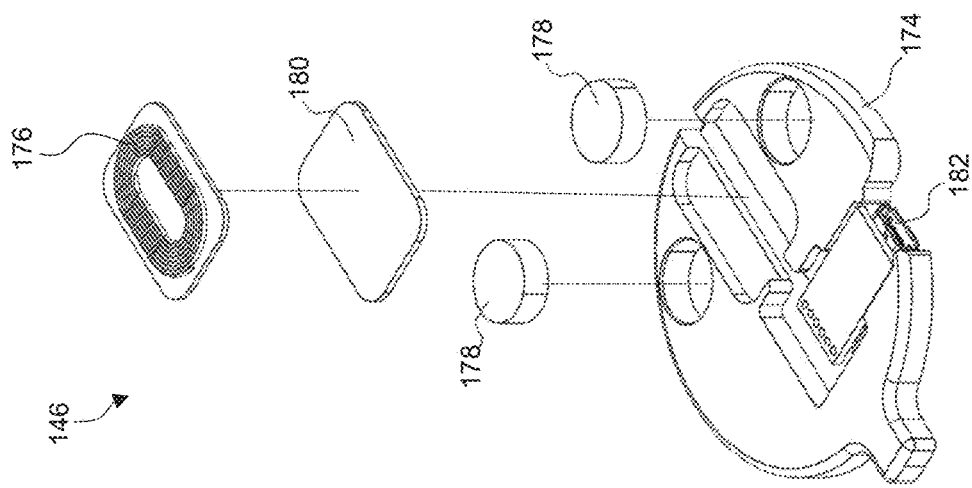
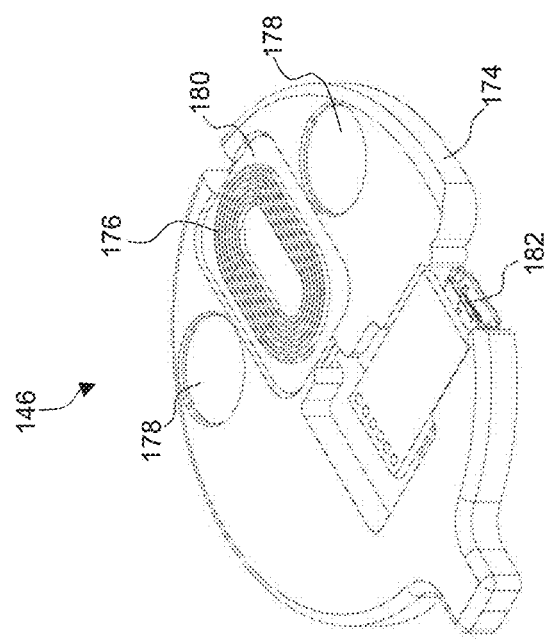

WIRELESS CHARGING ASSEMBLIES FOR SENSORIZED INSOLES, METHODS FOR CHARGING SENSORIZED INSOLES, AND FOOTWEAR SYSTEMS INCLUDING SENSORIZED INSOLES

CROSS REFERENCES TO RELATED APPLICATIONS

This application is a continuation of U.S. patent application Ser. No. 18/062,063 filed on Dec. 6, 2022, which claims the benefit of U.S. Provisional Patent Application No. 63/290,247 filed on Dec. 16, 2021, and claims priority to Canadian patent application no. 3175982 filed on Sep. 27, 2022. Each of the aforementioned applications is incorporated herein by reference in its entirety.

FIELD

This document relates to sensorized insoles, such as insoles that include pressure and/or temperature sensors. More specifically, this document relates to wireless charging assemblies for sensorized insoles, methods for charging sensorized insoles, and footwear systems including sensorized insoles.

BACKGROUND

U.S. Pat. No. 8,058,837 (Beers et al.) discloses an article of footwear and a footwear housing. The footwear housing includes a charging station that can be used to charge a battery in the footwear housing.

U.S. Patent Application Publication No. 2014/0354218 (Kaynar et al.) discloses a magnetic mounting system configured to charge a personal electronic device with integrated conductive charging of the personal electronic device. The system includes a case configured to connect to the personal electronic device. The case is attached to a printed circuit board, wiring, and a plurality of metal plates. A housing is arranged proximate the casing. The housing includes a plurality of magnets and a plurality of pins. Aligning the plurality of magnets with the plurality of pins detachably couples the case to the housing. Aligning the plurality of pins and the printed circuit board provides electricity from the plurality of pins to the printed circuit board when the case is attached to the housing to charge the personal electronic device in the case.

SUMMARY

The following summary is intended to introduce the reader to various aspects of the detailed description, but not to define or delimit any invention.

Footwear systems are disclosed. According to some aspects, a footwear system includes at least a first sensorized insole having a first insole bulk with a first foot-facing upper surface and a first ground-facing lower surface. At least a first sensor is embedded in the first insole bulk for measuring a parameter of a user's first foot. At least a first battery is embedded in the first insole bulk for providing energy to the first sensor. At least a first wireless charging receiver pod is embedded in the first insole bulk for wirelessly receiving energy and providing energy to the first battery. The system further includes a first wireless charging transmitter pod that is electrically connectable to an energy source for receiving energy from the energy source and wirelessly transmitting energy to the first wireless charging receiver pod. The first wireless charging transmitter pod is positionable against the first foot-facing upper surface to wirelessly provide energy to the first wireless charging receiver pod through the first insole bulk. The system further includes a wireless charging mat that is electrically connectable to the energy source for receiving energy from the energy source and wirelessly transmitting energy to the first wireless charging receiver pod. The wireless charging mat is positionable adjacent the first ground-facing lower surface to wirelessly provide energy to the first wireless charging receiver pod through the first insole bulk. The system is configured to allow only one of the first wireless charging transmitter pod and the wireless charging mat to provide energy to the first wireless charging receiver pod at a given time.

In some examples, the footwear system further includes a second sensorized insole. The second sensorized insole can have a second insole bulk with a second foot-facing upper surface and a second ground-facing lower surface, at least a second sensor embedded in the second insole bulk for measuring a parameter of a user's second foot, at least a second battery embedded in the second insole bulk for providing energy to the second sensor, and at least a second wireless charging receiver pod embedded in the second insole bulk and spaced from the second foot-facing upper surface for wirelessly receiving energy and providing energy to the second battery. The system can further include a second wireless charging transmitter pod that is electrically connectable to the energy source for receiving energy from the energy source and wirelessly transmitting energy to the second wireless charging receiver pod. The second wireless charging transmitter pod can be positionable against the second foot-facing upper surface to wirelessly provide energy to the second wireless charging receiver pod through the second insole bulk. The wireless charging mat can be further configured to wirelessly transmit energy to the second wireless charging receiver pod and can be positionable adjacent the second ground-facing lower surface to wirelessly provide energy to the second wireless charging receiver pod through the second insole bulk. The system can be configured to allow only one of the second wireless charging transmitter pod and the charging mat to provide energy to the second wireless charging receiver pod at a given time.

In some examples, the first wireless charging receiver pod includes a first receiver coil, and the first wireless charging transmitter pod includes a first transmitter coil for inducing a current in the first receiver coil. The second wireless charging receiver pod can include a second receiver coil, and the second wireless charging transmitter pod can include a second transmitter coil for inducing a current in the second receiver coil. The wireless charging mat can include a single mat coil for inducing a current in both the first receiver coil and the second receiver coil.

In some examples, the first wireless transmitter pod and the wireless charging mat employ high frequency inductive charging.

In some examples, the first sensorized insole is positionable in a first shoe, the first wireless charging transmitter pod is insertable through a foot-receiving opening of the first shoe to position the first wireless charging transmitter pod against the first foot-facing upper surface, and the first shoe is restable on the wireless charging mat to position the wireless charging mat adjacent the ground-facing lower surface. The wireless charging mat can be configured to provide energy to the first wireless charging receiver pod through a sole of the first shoe.

In some examples, the first wireless charging receiver pod includes a first receiver coil and a first electromagnetic interference (EMI) shield, and when the wireless charging mat is providing energy to the first wireless charging receiver pod, the first EMI shield is positioned between the first wireless charging transmitter pod and the first receiver coil.

In some examples, the first wireless charging receiver pod further comprises a second EMI shield, and when the first wireless charging transmitter pod is providing energy to the first wireless charging receiver pod, the second EMI shield is positioned between the wireless charging mat and the first receiver coil.

In some examples, when one of the wireless charging mat and the first wireless charging transmitter pod is a first one positioned to wirelessly provide energy to the first wireless charging receiver pod, and the other of the wireless charging mat and the first wireless charging transmitter pod is a second one positioned to wirelessly provide energy to the first wireless charging receiver pod, the system is configured to allow the first one of the wireless charging mat and the first wireless charging transmitter pod to wirelessly provide energy to the first wireless charging receiver pod, and to prevent the second one of the wireless charging mat and the first wireless charging transmitter pod from wirelessly providing energy to the first wireless charging receiver pod.

In some examples, the wireless charging mat is further positionable against the first foot-facing upper surface to wirelessly provide energy to the first wireless charging receiver pod through the first insole bulk.

In some examples, the wireless charging mat is configured to emit an electromagnetic field of a frequency that is tuned to a position of the wireless charging receiver pod with respect to the wireless charging mat.

In some examples, the system further comprises a mat sensor disposed within the wireless charging mat and a processor configured to receive at least one sensor reading from the mat sensor.

In some examples, the mat sensor is a pressure sensor, a force sensor, a load cell, a temperature sensor, a global positioning system, or an inertial measurement unit.

In some examples, the processor is configured to determine a user weight from the at least one sensor reading when the mat sensor is a pressure sensor, a force sensor, or a load cell.

In some examples, the processor is configured to determine the user weight over a first time window, and the wireless charging mat is configured to transmit energy to the first wireless charging receiver pod or the second wireless charging receiver pod over a second time window, and the first time window and the second time window do not overlap.

In some examples, the processor is further configured to use the user weight as an input to a game.

In some examples, the processor is further configured to transmit the user weight to an output device.

In some examples, the output device is configured to generate a visual display based on the user weight.

In some examples, the output device is configured to generate an audio signal based on the user weight.

In some examples, the output device is configured to generate a haptic signal based on the user weight.

In some examples, the energy source is a portable power bank.

In some examples, the wireless charging mat is portable.

In some examples, the wireless charging mat is foldable.

In some examples, the wireless charging mat includes a receptable within which the first sensorized insole and the second sensorized insole are receivable when the first sensorized insole and the second sensorized insole are not being worn by the user.

Methods for charging at least one sensorized insole also disclosed. According to some aspects, a method for charging at least one sensorized insole includes: a. providing a first wireless charging transmitter pod; b. providing a wireless charging mat; c. positioning the first wireless charging transmitter pod against a first foot-facing upper surface of a first sensorized insole, and/or positioning a first ground-facing lower surface of the first sensorized insole adjacent the wireless charging mat; and d. transferring energy from only one of the first wireless charging transmitter pod and the wireless charging mat to a first wireless charging receiver pod embedded in the first insole bulk.

In some examples, the method further includes: e. providing a second wireless charging transmitter pod; f. positioning the second wireless charging transmitter pod against a second foot-facing upper surface of the second sensorized insole, and/or positioning a second ground-facing lower surface of the second sensorized insole adjacent the wireless charging mat; and g. transferring energy from only one of the second wireless charging transmitter pod and the wireless charging mat to a second wireless charging receiver pod embedded in the second insole bulk.

In some examples, the method further includes connecting the first wireless charging transmitter pod, the wireless charging mat, and/or the second wireless charging transmitter pod to an energy source.

In some examples, the energy source is a portable power bank.

In some examples, the method further includes transferring energy via high frequency inductive charging.

In some examples, the method further includes inducing a current in a first receiver coil of the first wireless charging receiver pod and in a second receiver coil of the second wireless charging receiver pod using a single transmitter coil of the wireless charging mat.

In some examples, step c. or step d. is carried out with the first sensorized insole positioned in a first shoe.

In some examples, positioning the first wireless charging transmitter pod against the first foot-facing upper surface of the first sensorized insole includes inserting the first wireless charging transmitter pod through a foot-receiving opening of the first shoe.

In some examples, positioning the first ground-facing lower surface of the first sensorized insole adjacent the wireless charging mat includes resting the first shoe on the wireless charging mat.

In some examples, step d. includes transferring energy from only the first wireless charging transmitter pod to the first wireless charging receiver pod, and the method further includes positioning an electromagnetic interference (EMI) shield between the first wireless charging receiver pod and the wireless charging mat.

In some examples, step d. includes transferring energy from only the wireless charging mat to the first wireless charging receiver pod, and the method further includes positioning an EMI shield between the first wireless charging receiver pod and the first wireless charging transmitter pod.

In some examples, step c. includes first positioning one of the first wireless charging transmitter pod and the wireless charging mat to wirelessly provide energy to the first wireless charging receiver pod, and then positioning the other of the first wireless charging transmitter pod and the wireless charging mat to wirelessly provide energy to the first wireless charging receiver pod. In some examples, step d. includes transferring energy from the one of the first wireless charging transmitter pod and the wireless charging mat to the first wireless charging receiver pod, and preventing the other of the first wireless charging transmitter pod and the wireless charging mat and from transferring energy to the first wireless charging receiver pod.

In some examples, the method further includes tuning a frequency of an electromagnetic field emitted by the wireless charging based on a position of the wireless charging receiver pod with respect to the wireless charging mat.

BRIEF DESCRIPTION OF THE DRAWINGS

The drawings included herewith are for illustrating various examples of articles, methods, and apparatuses of the present specification and are not intended to limit the scope of what is taught in any way. In the drawings:

FIG. 1A is a perspective view of an example footwear system, showing a charger in position to be coupled to a pair of sensorized insoles within a pair of shoes;

FIG. 1B is a perspective view of the footwear system of FIG. 1A, showing the charger coupled to the insoles;

FIG. 2 is a perspective view of a sensorized insole with a transmitter pod of the charger of FIGS. 1A and 1B coupled thereto;

FIG. 3 is a cross section taken along line 3-3 in FIG. 2;

FIG. 5 is an enlarged perspective view of the transmitter pod of FIGS. 2, 3, and 4;

FIG. 6 is a rear perspective view of the transmitter pod of FIG. 5, with a housing thereof removed;

FIG. 7 is a front perspective view of the transmitter pod of FIG. 5, with a housing thereof removed;

FIG. 8 is a perspective view of a receiver pod of the sensorized insole of FIGS. 2, 3, and 4;

FIG. 9 is an exploded view of the receiver pod of FIG. 8;

DETAILED DESCRIPTION

Figure 4:
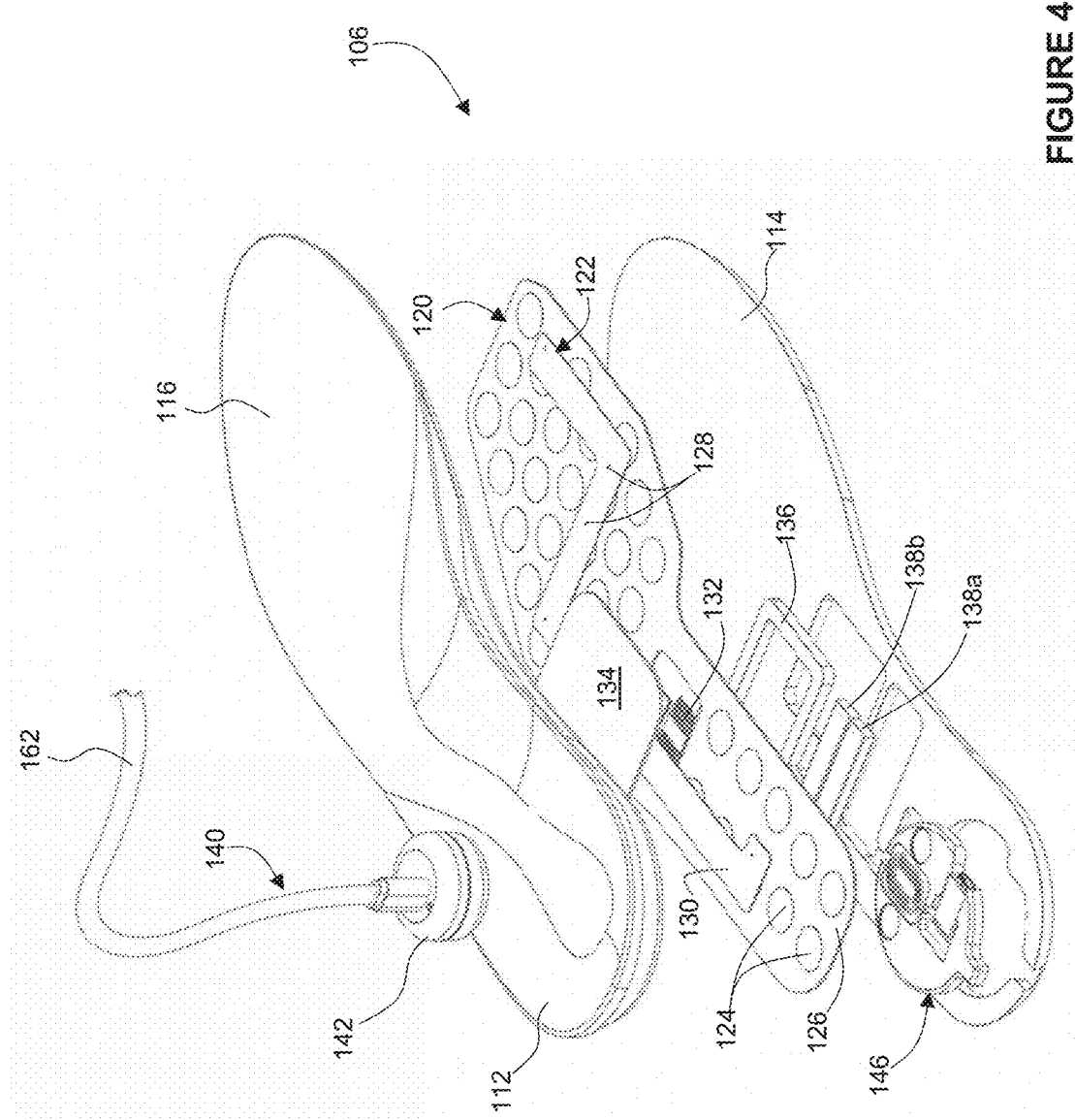
FIG. 4 is an exploded view of the sensorized insole and transmitter pod of FIG. 2.

Various apparatuses or processes or compositions will be described below to provide an example of an embodiment of the claimed subject matter. No embodiment described below limits any claim and any claim may cover processes or apparatuses or compositions that differ from those described below. The claims are not limited to apparatuses or processes or compositions having all of the features of any one apparatus or process or composition described below or to features common to multiple or all of the apparatuses or processes or compositions described below. It is possible that an apparatus or process or composition described below is not an embodiment of any exclusive right granted by issuance of this patent application. Any subject matter described below and for which an exclusive right is not granted by issuance of this patent application may be the subject matter of another protective instrument, for example, a continuing patent application, and the applicants, inventors or owners do not intend to abandon, disclaim or dedicate to the public any such subject matter by its disclosure in this document.

As used herein, the term 'about' indicates that a referenced value may vary by plus or minus 5%. For example, a reference to a length of 'about 10 mm' indicates that the length may be between 9.5 mm and 10.5 mm.

In this document, unless specified otherwise, all ranges are inclusive of the bounds of the range. For example, the statement that a length may be 'between 5 mm and 15 mm' indicates that the length may be 5 mm, or 15 mm, or any number therebetween.

Generally disclosed herein are wireless charging assemblies for sensorized insoles (such as but not limited to sensory insoles for the prevention of diabetic foot ulcers, such as those sold by Orpyx Medical Technologies Inc. and described in U.S. Pat. No. 10,004,428), and related systems and methods.

The wireless charging assemblies may in some examples be relatively easy to use, particularly for users of limited dexterity and/or mobility. For example, the wireless charging assemblies may be used without necessarily requiring that the sensorized insole(s) be removed from the user's shoe(s), and without necessarily requiring a plug or receptacle of the wireless charging assembly to be mated to a corresponding plug or receptacle of the sensorized insole. That is, in some examples, with the sensorized insole in a shoe, the user may simply drop or place a transmitter pod of the wireless charging assembly into the shoe. The transmitter pod may then magnetically couple to a receiver pod that is embedded in the insole, and commence charging the sensorized insole via an LC (inductor capacitor) circuit. In other examples, with the sensorized insole in a shoe, the user may simply place the shoe on a wireless charging mat. The wireless charging mat may then commence charging the sensorized insole via an LC (inductor capacitor) circuit. In some examples, the wireless charging assemblies may include both a transmitter pod and a wireless charging mat, and the user may select which of the transmitter pod and the wireless charging mat to use (e.g. the transmitter pod may be used for travel, and the wireless charging mat may be used at home).

Furthermore, the wireless charging assemblies may be configured to wirelessly charge sensorized insoles of various thickness, where in use the transmitter pod and receiver pod are not necessarily spaced apart by a pre-set distance, and/or where the wireless charging mat and receiver pod are not necessarily spaced apart by a pre-set distance. That is, in some instances, the sensorized insoles may be in the form of custom orthotics, which are custom manufactured to fit a user's foot. In such instances, each sensorized insole may have a thickness that is customized to fit the foot of the user. Even for a given user, the sensorized insole for the user's left foot may be of a different thickness than the sensorized insole for the user's right foot. As will be described in further detail below, the wireless charging assemblies may be configured to detect and adjust for the thickness of the insole and the thickness of shoes soles, in order to effectively charge a given sensorized insole. Furthermore, in instances where the sensorized insole is being charged through the sole of a shoe, the wireless charging assemblies may be configured to detect and adjust for the thickness of the insole and sole, in order to effectively charge a given sensorized insole.

Furthermore, the wireless charging assemblies may be configured to have a minimized or reduced peak emission. Particularly, the wireless charging assemblies may include a pair of transmitter pods (i.e. one for each sensorized insole of a pair). The transmitter pods may be configured to transfer energy at an oscillating frequency, to reduce the peak emission of the system. Furthermore, the transmitter pods may be configured to oscillate frequency asynchronously, to reduce the peak emission even further.

Referring now to FIGS. 1A and 1B, an example footwear system 100 is shown. The footwear system 100 includes a first shoe 102 and a second shoe 104 (i.e. a left shoe and a right shoe of a pair). A first sensorized insole 106 (shown in FIGS. 2 to 4) is received in the first shoe 102, and a second sensorized insole (not shown) is received in the second shoe 104. When the shoes 102,104 are being worn, the first sensorized insole 106 and second sensorized insole may be used to collect data (e.g. regarding the wearer's health, activity, movement, or gait). The first shoe and second shoe or first insole and second insole may be designated for gaming. When the shoes 102,104 are not being worn, the batteries of the first sensorized insole 106 and the second sensorized insole may be electrically charged by a wireless charging assembly 108, which is described in further detail below.

Referring now to FIGS. 2 and 3, the first sensorized insole 106 and a portion of the wireless charging assembly 108 are shown in greater detail. For brevity, only the first sensorized insole 106 and the related features of the wireless charging assembly 108 are shown. The second sensorized insole is similar to the first sensorized insole 106, and is not shown. Furthermore, although the first sensorized insole 106 may be charged while remaining in the first shoe 102 (as shown in FIGS. 1A and 1B), for clarity, the first shoe 102 is not shown in FIGS. 2 and 3.

Referring still to FIGS. 2 and 3, the first sensorized insole 106 includes an insole bulk 110 (also referred to herein as a 'first insole bulk'), which may be made up of one or more layers such as a cushion layer, a support layer, a gel layer, an anti-odor layer, a thermal insulation layer, and/or a foam layer. In the example shown, the first sensorized insole 106 is in the form of an orthotic that is custom manufactured for a user. For example, the user's foot may be assessed (e.g. by a podiatrist, optionally using plaster casting or 3D scanning), and the insole bulk 110 may be custom fashioned based on the assessment, for example in order to support the user's foot, improve foot function, relieve pain, and/or relieve pressure. In the example shown, the insole bulk 110 includes a top layer 112 and a base layer 114. The top layer 112 may in turn include multiple sub-layers, such as an upper finishing layer (not shown), a middle comfort layer (not shown), and a contoured layer (not shown). Likewise, the base layer 114 may include multiple sub-layers. Various sub-layers are described in international patent application no. PCT/CA2020/051520 (publication no. WO 2021/092676), which is incorporated herein by reference in its entirety.

In other examples, the sensorized insoles may be another type of insole, such as a non-custom, generic insole (e.g. a comfort insole, an athletic insole, a gaming insole, a shock-absorbing insole, or a gel insole). The non-custom, generic insoles, and may be of a uniform thickness, which may be the case for insoles used for gaming. Furthermore the sensorized insoles may in some examples be integral with the shoes.

Referring still to FIGS. 2 and 3, the insole bulk 110 has a foot-facing upper surface 116 (also referred to herein as a 'first foot-facing upper surface'), and a ground-facing lower surface 118 (also referred to herein as a 'first ground-facing lower surface'). In use, the foot-facing upper surface 116 faces upwardly towards a user's foot (e.g. contacts the user's skin or sock), and the ground-facing lower surface 118 faces downwardly (e.g. contacts the inner surface of the shoe 102).

Various sensors may be embedded in the insole bulk 110, for measuring a parameter of a user's first foot (e.g. a parameter relating to the user's health, activity, movement, gait, or location). Furthermore, one or more batteries may be embedded in the insole bulk 110, for providing energy to the sensor(s). The sensors may in some examples include one or more of: a heart rate sensor, a blood pressure sensor, an oxygen saturation sensor, an oxygen sensor, a respiratory rate sensor, a blood flow sensor, a cardiac output sensor, a perfusion sensor, a pressure sensor, a temperature sensor, a motion sensor, an inertial measurement unit (IMU), a weight sensor, a body mass index sensor, a moisture sensor, a hydration sensor, a perspiration rate sensor, sweat electrolyte sensor, a bacterial load sensor, an inductance sensor, a resistance sensor, a dielectric sensor, a capacitance sensor, a conductance sensor, an impairment sensor, a sleep sensor, a fatigue sensor, an electrocardiogram sensor, an electromyography sensor, an electroencephalogram sensor, an odor sensor, a taste sensor, a stress sensor, a shear sensor, a respiratory flow rate sensor, a lung function sensor, a Global Positioning System (GPS), an accelerometer, a gyroscope, a magnetometer, an altimeter, a compass, an image capturing sensor, a limb positioning measurement device, a light sensor, an oxygen sensor, another type of sensor that measures a physiologic (al) characteristic indicative of the functions and activities of a living organism, and combinations thereof.

Referring to FIG. 4, in the example shown, both a pressure sensor array 120 and an optional temperature sensor array 122 are embedded in the insole bulk 110. The pressure sensor array 120 includes a plurality of pressure sensors 124 (only two of which are labelled) printed on flexible polymer film 126. Likewise, the temperature sensor array 122 includes a plurality of temperature sensors 128 (only two of which are labelled) printed on flexible polymer film 130. Optionally, an IMU (not shown) may also be embedded in the insole bulk 110. Furthermore, a circuit board 132 is embedded in the insole bulk 110, together with an optional mechanical shield (e.g. a carbon fiber mechanical shield) 134 and an optional rigid support 136. The mechanical shield 134 serves to distribute pressure to protect the circuit board 132, and the rigid support 136 maintains the mechanical shield 134 in position above the circuit board 132. A pair of batteries 138a, 138b are further embedded in the insole bulk 110, for providing energy to the sensors 124, 128. As will be described below, the batteries 138a, 138b are chargeable by the wireless charging assembly 108. Such sensor arrays, batteries, and circuit boards are described in international patent application no. PCT/CA2020/051520 (publication no. WO 2021/092676), which is incorporated herein by reference in its entirety.

The circuit board 132 can be communicatively coupled to one or more remote processing devices, e.g. using a wireless communication module (e.g., Bluetooth, Bluetooth Low-Energy, Wi-Fi, ANT+ IEEE 802.11, etc.). The remote processing devices can be any type of processing device such as (but not limited to) a personal computer, a tablet, and a mobile device such as a smartphone, a smartwatch or a wristband. The circuit board 132 can also be communicatively coupled to remote cloud server over, for example, a wide area network such as the Internet. A remote cloud server may provide additional processing resources not available on the circuit board 132 or the one or more remote processing devices.

Each remote processing device and optional remote cloud server typically includes a processing unit, an output device (such as a display, speaker, and/or tactile feedback device), a user interface, an interface unit for communicating with other devices, Input/Output (I/O) hardware, a wireless unit (e.g. a radio that communicates using CDMA, GSM, GPRS or Bluetooth protocol according to standards such as IEEE 802.11a, 802.11b, 802.11g, or 802.11n), a power unit, and a memory unit. The memory unit can include RAM, ROM, one or more hard drives, one or more flash drives, or some other suitable data storage elements such as disk drives, etc.

The processing unit controls the operation of the remote processing device or the remote cloud server and can be any suitable processor, controller or digital signal processor that can provide sufficient processing power depending on the desired configuration, purposes, and requirements of the first sensorized insole 106.

The display can be any suitable display that provides visual information. For instance, the display can be a cathode ray tube, or a flat-screen monitor and the like if the remote processing device or remote cloud server is a desktop computer. In other cases, the display can be a display suitable for a laptop, tablet, or handheld device, such as an LED or LCD-based display and the like.

As used herein, the term 'embedded' indicates that at least a portion of the referenced part is positioned between the layers of the insole bulk 110, or within one or more layers of the insole bulk 110. For example, the referenced part can be nested in a pocket of a first layer, and then covered by a second layer. In the example shown, the pressure sensor array 120, optional temperature sensor array 122, and circuit board 132 are sandwiched between the top layer 112 and the base layer 114 of the insole bulk 110, while the batteries 138a, 138b are nested in a pocket of the base layer 114.

As used herein, the term "battery" can refer to any portable and chargeable energy storage device, such as chemical battery (e.g. a lithium ion battery) or a super capacitor.

Similarly to the first sensorized insole 106, the second sensorized insole (not shown) may include a second insole bulk, a second foot-facing upper surface, a second ground-facing lower surface, at least a second sensor embedded in the insole bulk, and at least a second battery embedded in the second insole bulk.

The wireless charging assembly 108 is configured to charge the batteries 138a, 138b of the first sensorized insole 106 and the batteries of the second sensorized insole. Referring back to FIGS. 1A to 3, in the example shown, the wireless charging assembly 108 includes a charger 140 that in turn includes first 142 and second 144 transmitter pods (also referred to herein as 'wireless charging transmitter pods'). The wireless charging assembly 108 further includes a first receiver pod 146 and a second receiver pod (not shown) (also referred to herein as 'wireless charging receiver pods'), which are embedded in the first insole bulk 110 and the second insole bulk, respectively. The first transmitter pod 142 can wirelessly transmit energy to either of the first receiver pod 146 and the second receiver pod, and the second transmitter pod 144 can wirelessly transmit energy to either of the first receiver pod 146 and the second receiver pod. The first receiver pod 146 wirelessly receives the energy and provides the energy to the batteries 138a, 138b of the first sensorized insole 106, and the second receiver pod wirelessly receives the energy and provides the energy to the batteries of the second sensorized insole.

More specifically, referring still to FIGS. 2 and 3, the first receiver pod 146 is embedded in the first insole bulk 110, and is spaced from the first foot-facing upper surface 116. In the example shown, the first receiver pod 146 is nested in a pocket of the base layer 114, and is covered by the top layer 112. The first transmitter pod 142 is positionable against the first foot-facing upper surface 116, and wirelessly transmits energy to the first receiver pod 146 through the first insole bulk 110 (i.e. through the top layer 112, in the example shown). Likewise, the second transmitter pod 144 (shown in FIG. 1A) wirelessly transmits energy to the second receiver pod (not shown), and the second receiver pod wirelessly receives the energy and provides the energy to the batteries (not shown) of the second sensorized insole (not shown). Similarly to the first receiver pod 146, the second receiver pod is embedded in the second insole bulk and is spaced from the second foot-facing upper surface, and the second transmitter pod is positionable against the second foot-facing upper surface to wirelessly provide energy to the second wireless charging receiver pod through the second insole bulk.

The first transmitter pod 142 and the first receiver pod 146 are described in greater detail below. For brevity the second transmitter pod 144 and second receiver pod are not shown or described in detail; however, the second transmitter pod 144 is similar to the first transmitter pod 142, and the second receiver pod is similar to the first receiver pod 146.

Referring now to FIGS. 5 to 7, the first transmitter pod 142 will be described in greater detail. In the example shown, the first transmitter pod 142 includes a housing 148 (shown in FIG. 5). The housing 148 can be sized so that the first transmitter pod 142 can readily pass through a foot-receiving opening 150 of the first shoe 102 or a foot receiving opening 151 of the second shoe 104 (shown in FIGS. 1A and 1B), and so that the first transmitter pod 142 can generally fit within the heel cup (not shown) of the first shoe 102 or second shoe 104 and sit generally flat against the foot-facing upper surface 116. That is, the first transmitter pod 142 may have a relatively small diameter. For example the first transmitter pod 142 may have a diameter of between 20 mm and 40 mm (e.g. about 30 mm) and height of between 10 mm and 20 mm (e.g. about 16 mm).

Referring to FIG. 6, the housing 148 (not shown in FIG. 6) houses a receptacle 152 (also referred to herein as a 'first receptacle') which in the example shown is a micro-USB port, a circuit board (not visible) (also referred to herein as a 'first circuit board'), a light pipe 154 (also referred to herein as a 'first light pipe'), and an electromagnetic interference (EMI) shield 156 (also referred to herein as a 'first EMI shield'). Referring to FIG. 7, the housing 148 further houses a transmitter coil 158 (also referred to herein as a 'first transmitter coil'), and a set of transmitter magnets 160 (also referred to herein as a 'first set of transmitter magnets', only two of which are labelled) that are arranged around the transmitter coil 158. The transmitter coil 158 is configured to receive a current from an energy source, and wirelessly induce a current in a receiver coil 176 of the first receiver pod 146 (described below). The transmitter magnets 160 are configured to magnetically couple the first transmitter pod 142 to the first receiver pod 146, to hold the first transmitter pod 142 in proximity to the first receiver pod 146. The first set of transmitter magnets 160 may include, for example, between 7 and 15 transmitter magnets 160. In the example shown, the first set of transmitter magnets 160 includes 11 transmitter magnets 160. The transmitter magnets 160 may be, for example, N38 rare earth magnets. The size of the transmitter magnets 160 may be selected to maximize magnetic coupling to the first receiver pod 146, while minimizing the diameter of the first transmitter pod 142 (i.e. so that the first transmitter pod 142 can readily pass through the foot-receiving opening 150, 151). For example, the transmitter magnets 160 may have a diameter of between about 2 mm and about 8 mm and a height of between about 3 mm and about 10 mm.

The second transmitter pod 144 is configured similarly to the first transmitter pod 142, and includes a second housing (not shown) that is configured so that the second transmitter pod 144 can readily pass through the foot-receiving opening 150 of the first shoe 102 or the foot-receiving opening 151 of the second shoe 104, a second receptacle (not shown), a second circuit board (not shown), a second light pipe (not shown), a second EMI shield (not shown), a second transmitter coil (not shown), and a second set of transmitter magnets arranged around the second transmitter coil (not shown).

Referring back to FIG. 5, in the example shown, the first transmitter pod 142 is electrically connected to a first cable 162 via the receptacle 152 (shown in FIG. 6). Referring back to FIG. 1, the charger 140 further includes a second cable 164, which is electrically connectable to the second transmitter pod 144. The first 162 and second 164 cables are connectable to an energy source (e.g. wall outlet 166), so that the first 142 and second 144 transmitter pods receive energy from the energy source via the first 162 and second 164 cables, respectively. More specifically, in the example shown, the first cable 162 and the second cable 164 are joined to a third cable 168 at a Y-junction 170, and the third cable 168 is electrically connectable to a plug 172 that can plug into the wall outlet 166.

In alternative examples, the energy source can itself be a battery, to allow for portability of the charger. An example of the portable energy source may include a power bank. The power bank may be connected to an energy source (e.g. wall outlet 166) to accumulate power, and then it may be disconnected from the energy source. The power bank may then be used to transfer energy to the wireless charging mat 108b, the first 142 and second 144 transmitter pods, and/or the insoles 106 themselves. The power bank is now the energy source and can be moved around with the insoles 106 and various chargers (i.e. so the system does not require the use of a wall outlet 166 during charging).

Referring now to FIGS. 8 and 9, the first receiver pod 146 will be described in more detail. In the example shown, the first receiver pod 146 includes a housing 174 (also referred to herein as a 'first housing'). The housing 174 is sized so that the first receiver pod 146 can be embedded in the insole bulk 110 without being readily detectable by a user (i.e. without the user feeling an object under their foot). That is, the first receiver pod 146 may have a relatively small thickness. For example the first receiver pod 146 may have a thickness of between about 2 mm and about 5 mm (e.g. about 3.75 mm).

Referring still to FIGS. 8 and 9, the housing 174 supports a receiver coil 176 (also referred to herein as a 'first receiver coil'), and a set of receiver magnets 178 (also referred to herein as a 'first set of receiver magnets'). The receiver coil 176 is configured to wirelessly receive energy by having a current induced therein by the transmitter coil 158. The receiver magnets 178 are configured to magnetically couple to the transmitter magnets 160 (shown in FIGS. 6 and 7), to hold the first receiver pod 146 in proximity to the first transmitter pod 142, so that the transmitter coil 158 can induce a current in the receiver coil 176. The first set of receiver magnets 178 may include, for example, between 2 and 6 receiver magnets 178. In the example shown, the first set of receiver magnets includes 2 receiver magnets 178 positioned on opposite sides of the receiver coil 176. The receiver magnets 178 may be, for example, N52 rare earth magnets. The size of the receiver magnets 178 may be selected to maximize magnetic coupling to the transmitter magnets 160, while minimizing the thickness of receiver pod 146 (i.e. so that the receiver pod 146 is generally not felt under the user's foot). For example, the receiver magnets 178 may have a diameter of between about 3 mm and about 12 mm and a height of between about 2 mm and about 5 mm.

In the example shown, the size constraints of the transmitter pod 142 are different from the size constraints of the receiver pod 146, as the transmitter pod 142 is configured to readily pass through the foot-receiving opening 150 of the first shoe 102 and the foot-receiving opening 151 of the second shoe 104 (and also to fit within the heel cup of the first 102 and second 104 shoes and sit flat against the foot facing upper surface 116), while the receiver pod 146 is configured to be embedded in the insole bulk 110 while remaining generally undetectable. As such, the height of each transmitter magnet 160 is greater than the height of each receiver magnet 178, and the diameter of each transmitter magnet 160 is less than a diameter of each receiver magnet 170. Furthermore, the set of transmitter magnets 160 includes a greater number of magnets than the set of receiver magnets 178. Nevertheless, the set of transmitter magnets 160 can magnetically couple to the set of receiver magnets 178, to hold the receiver pod 146 in proximity to the transmitter pod 142, so that the transmitter coil 158 can induce a current in the receiver coil 176.

In alternative examples, in addition to or as an alternative to the transmitter magnets 160 and receiver magnets 178, other mechanisms may be used to align the transmitter pod 142 to the receiver pod 146 and hold the transmitter pod 142 in proximity to the receiver pod 146. For example, a visual indicator (e.g. in the form of a target) may be provided on the foot-facing upper surface 116, to guide a user in placing the transmitter pod 142 in proximity to the receiver pod 146. For further example, a set of grooves (or another mechanical feature) may be provided for guiding a user in placing the transmitter pod 142 in proximity to the receiver pod 146 and mating the transmitter pod 142 to the insole 106.

Referring still to FIGS. 8 and 9, in the example shown, the receiver pod 146 further includes an EMI shield 180 (also referred to herein as a 'first EMI shield'). The EMI shield may be a carbon fiber or ferrite EMI shield, and may serve to protect the receiver coil 176 from electromagnetic interference. The EMI shield may be made of ferromagnetic material or any material that alters magnetic fields. The EMI shield may further support the receiver coil 176 and protect the receiver coil 176 from deformation that may occur during use of the sensorized insoles. The receiver pod 146 further includes a receptacle 182 (also referred to herein as a 'first receptacle') in the form of a micro-USB port, which is used to electrically connect the receiver coil 179 to the batteries 138a, 138b (shown in FIG. 4).

Referring back to FIG. 3, in use of the first sensorized insole 106, when the transmitter pod 142 is positioned against the foot-facing upper surface 116 and magnetically coupled to the receiver pod 146, energy is transferred from the transmitter coil 158 of the transmitter pod 142 to the receiver coil 176 of the receiver pod 146. Particularly, energy is transferred through the insole bulk 110, via an inductor capacitor circuit. In the example shown, the receiver coil 176 is spaced from the foot-facing upper surface 116 by a spacing 184 (also referred to herein as a 'first spacing'), which is defined by the thickness of the portion of the top layer 112 that overlies the receiver coil 176. Likewise, in the second sensorized insole (not shown), the second receiver coil is spaced from the second foot-facing upper surface by a second spacing. As noted above, in the example shown, the first sensorized insole 106 and the second sensorized insole (not shown) are in the form of custom orthotics, which are custom manufactured to fit a user's feet. Accordingly, the size of first spacing 184 may be unique to each user, as the thickness of the top layer 112 of the first sensorized insole 106 is determined at least in part by the assessment of the user's foot. Likewise, the size of the second spacing (not shown) may be unique to each user, as the thickness of the top layer of the second sensorized insole is determined at least in part by the assessment of the user's foot. For example, for a user with high arches, the top layer 112 may be relatively thick and the spacing 184 may thus be relatively large. On the contrary, for a user with relatively low arches, the top layer 112 may be relatively thin and the spacing 184 may thus be relatively small. Furthermore, even for a given user, the first spacing 184 may be different from the second spacing (e.g. in the case where a user's left foot has a different arch height from the user's right foot). More specifically, the first spacing 184 and the second spacing may on average be about 6 mm, but may vary between about 1 mm (e.g. where the top layer 112 includes only an upper finishing layer and the middle comfort layer and contour layer are omitted) and up to 18 mm. Accordingly, the first spacing 184 may differ between users by up to 17 mm, or more commonly, by up to about 4 mm. Furthermore, the first spacing 184 and the second spacing may differ between feet by up to 17 mm, or more commonly, by up to about 4 mm.

In order to account for the variable nature of the first spacing 184 and the second spacing, the first transmitter pod 142 is configured to detect the spacing of the insole to which it is coupled, and adjust its output accordingly, in order to effectively transfer energy at a given spacing. Likewise, the second transmitter pod 144 is configured to detect the spacing of the insole to which it is coupled, and adjust its output accordingly, in order to effectively transfer energy at a given spacing. That is, when coupled to the first sensorized insole 106, the first transmitter pod 142 will detect the first spacing 184, and emit an electromagnetic field of a frequency that is tuned to the first spacing 184. In order to do this, the first transmitter pod 142 is configured to emit a series of stimulation pulses to the receiver coil 176, receive a series of response pulses back from the receiver coil 176, and adjust the output thereof based on the response pulses. More specifically, the transmitter coil 158 is configured to send out a series of stimulation pulses (also referred to as 'pings') of a narrow band that is close to the resonant frequency of the circuit. When these stimulation pulses are received by the receiver coil 176, response pulses are emitted, and the response pulses are detected by the transmitter coil 158. When the response pulses are detected, the transmitter pod 142 recognizes the presence of the receiver coil 176 in proximity to the transmitter coil 158, and begins to emit pings at a broader band. The receiver coil 176 will continue to emit response pulses, and based on the response pulses, the transmitter pod 142 will determine an operating frequency (i.e. a highest efficiency frequency). The transmitter pod 142 will then select that frequency and begin transferring energy at that frequency. For example, if the transmitter coil 158 has a diameter of about 18 mm, and the transmitter coil 158 and receiver coil 176 are spaced apart by between about 1 mm and 18 mm, the operating frequency may be between about 0.43 MHz and 0.45 MHz. The second transmitter pod 144 operates in a similar fashion.

Because the transmitter pods 142, 144 are configured to adjust their output based on the spacing of the sensorized insole to which they are coupled, the transmitter pods 142, 144 can be manufactured in bulk, even though the sensorized insoles themselves may be custom manufactured for each user. Furthermore, because the transmitter pods 142, 144 are configured to adjust their output based on the spacing of the sensorized insole to which they are coupled, the user need not necessarily have a transmitter pod that is designated for a left sensorized insole and a transmitter pod that is designated for a right sensorized insole. Rather, the first transmitter pod 142 and second transmitter pod 144 can be interchangeable. That is, the first transmitter pod 142 can be positioned against either the foot-facing upper surface 116 of the first sensorized insole 106 to wirelessly provide energy to the first receiver pod 146 through the first insole bulk 110, or against the foot-facing upper surface of the second sensorized insole to wirelessly provide energy to the second wireless charging receiver pod through the second insole bulk. Likewise, the second transmitter pod 144 can be positioned against either the second foot-facing upper surface to wirelessly provide energy to the second wireless charging receiver pod through the second insole bulk, or against the first foot-facing upper surface 116 to wirelessly provide energy to the first wireless charging receiver pod through the first insole bulk 110.

In addition, in order to minimize or reduce conducted emissions from the wireless charging assembly 108, the electromagnetic field emitted from the first transmitter pod 142 (also referred to herein as a 'first electromagnetic field') may be dithered, and the electromagnetic field emitted from the second transmitter pod 144 (also referred to herein as a 'second electromagnetic field') may be dithered. That is, energy may be transferred at a frequency that oscillates slightly around the operating frequency, to reduce the peak emission of the system. Furthermore, the second electromagnetic field may be dithered asynchronously with the first electromagnetic field, to reduce peak emissions even further.

In order to mitigate any issues caused by the generation of heat during charging, the first transmitter pod 142 may be configured to detect the temperature in the vicinity of the transmitter coil 158, and turn off for a preset time period (e.g. about 20 seconds) if the temperature exceeds a predetermined threshold (e.g. a temperature of about 50 degrees Celsius). The second transmitter pod 144 may be similarly configured.

In general, in use, the first sensorized insole 106 and the second sensorized insole can be positioned in a user's shoes 102, 104. Shoes 102, 104 can be a pair of indoor shoes designated for gaming, and they can be worn, for example, to perform a gaming activity. Following the activity, when the shoes 102, 104 are removed from the user's feet, the first sensorized insole 106 and second sensorized insole can be charged. As noted above, the user need not necessarily remove the first sensorized insole 106 and second sensorized insole from the shoes 102, 104; the first sensorized insole 106 and second sensorized insole can remain in the shoes 102, 104 during charging. That is, with the first sensorized insole 106 remaining in the first shoe 102 and the second sensorized insole remaining in the second shoe 104, the user can insert the first transmitter pod 142 through the foot-receiving opening 150 of the first shoe 102 and position the first transmitter pod 142 against the first foot-facing upper surface 116 of the first insole bulk 110, and insert the second transmitter pod 144 through the foot-receiving opening 151 of the second shoe 104 and position the second transmitter pod 144 against the second foot-facing upper surface of the second insole bulk. This can be achieved, for example, by simply dropping the first transmitter pod 142 into the first shoe 102 and allowing the first transmitter pod 142 to magnetically couple to the first receiver pod 146, and dropping the second transmitter pod 144 into the second shoe 104 and allowing the second transmitter pod 144 to magnetically couple to the second receiver pod. As noted above, the transmitter pods 142, 144 are each configured to charge the first sensorized insole 106 and the second sensorized insole, even if the first sensorized insole 106 and the second sensorized insole have different thicknesses. Accordingly, the user can drop either transmitter pod 142, 144 into either shoe 102, 104 (i.e. the transmitter pods 142, 144 could be removed from the shoes 102, 104 and swapped, so that the second transmitter pod 144 is inserted through the foot-receiving opening 150 of the first shoe 102, positioned against the foot-facing upper surface 116 of the first insole bulk 110, and magnetically coupled to the first receiver pod 146). Energy will then be transferred from the energy source (i.e. the wall outlet 166) to the first 142 and second 144 transmitter pods via the cables 162, 164, 168, and from the first 142 and second 144 transmitter pods to the first 146 and second receiver pods, respectively.

Figure 10:
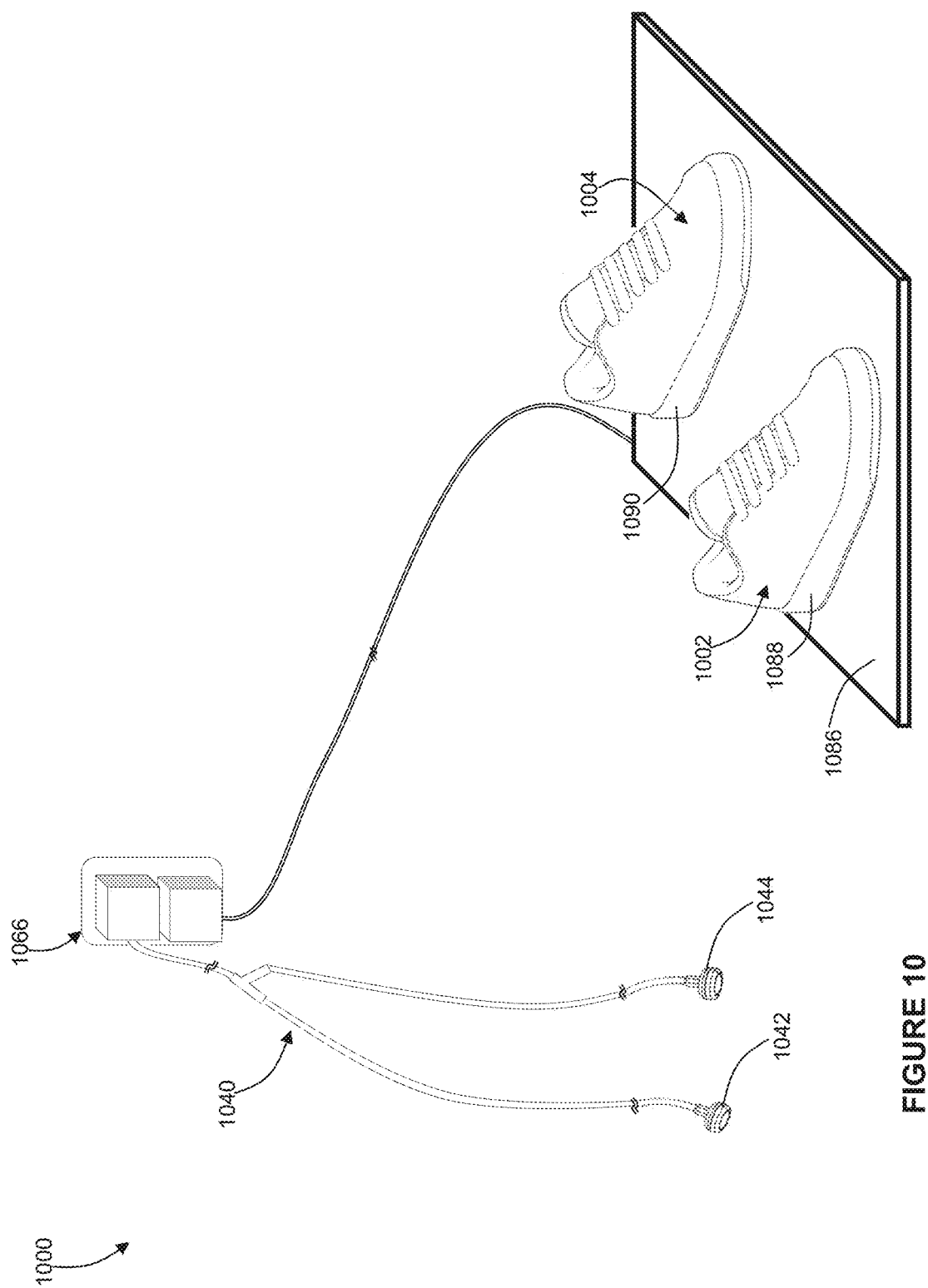
FIG. 10 is a perspective view of another example footwear system, showing a charging mat in position to charge a pair of sensorized insoles within a pair of shoes, and showing a pair of transmitter pods set aside.

Referring now to FIG. 10, an alternative example of a footwear system is shown. In FIG. 10, features that are like those of FIGS. 1 to 9 will be identified with like reference numerals as in FIGS. 1 to 9, incremented by 900.

The footwear system 1000 of FIG. 10 is similar to that of FIGS. 1 to 9; however, the footwear system further includes a wireless charging mat 1086 (also referred to herein simply as 'mat 1086') in addition to the charger 1040. The mat 1086 may provide the user with flexibility in charging the sensorized insoles (which are positioned in the shoes 1002, 1004 in FIG. 10 and are not visible). For example, the mat 1086 may be used in environments such as a user's home, where it can remain, for example, on a floor near where the user typically removes their shoes, or in the same room as a game console (in some examples, the insoles can be a game controller or game console). In contrast, as the charger 1040 is relatively portable, it may be used in situations such as travel. Thus, the user may choose whether to use the mat 1086 or the charger 1040.

As shown in FIG. 10, the mat 1086 may be used by resting the shoes 1002, 1004 on the mat, while the sensorized insoles are in the shoes 1002, 1004, to position the mat 1086 adjacent the ground-facing lower surfaces (not shown) of the sensorized insoles. The mat 1086 is electrically connectable to an energy source, such as the wall outlet 1066, and can wirelessly transmit energy through the soles 1088, 1090 of the shoes 1002, 1004 and through each insole bulk (not shown), to charge the batteries (not shown) of the sensorized insoles.

In the example shown, the mat 1086 can charge both of the sensorized insoles at the same time. That is, the mat 1086 is configured to wirelessly transmit energy to both the first 1046 (shown in FIG. 11) and the second wireless charging receiver pod (not shown), and is positionable adjacent both the first and the second ground-facing lower surfaces, to wirelessly provide energy to the first wireless charging receiver pod 1046 through the first insole bulk, and to the second wireless charging receiver pod through the second insole bulk.

In the example shown, the mat 1086 includes a single mat piece, which charges both of the sensorized insoles. In alternative examples the mat 1086 can include two separate mat pieces—i.e. one for each sensorized insole.

In the example shown, the mat 1086 includes a mat bulk (e.g. a foam, plastic, or rubber bulk, not shown), and a single transmitter coil (also referred to herein as a 'mat coil', not shown) operating at a high frequency for inducing a current in both the first receiver coil 1076 (shown in FIG. 11) and the second receiver coil (not shown). In alternative examples, the mat 1086 may include two or more coils. Additionally, the mat 1086 may further include an EMI shield (not shown) between the ground facing surface and the transmitter coil.

Optionally, the mat 1086 may contain one or more mat sensors for measuring a parameter of the mat or of a user standing on the mat. The one or more mat sensors may be a pressure sensor (such as a piezoelectric, capacitive, or piezoresistive pressure sensor), a force sensor (such as a load cell or strain gauge), a temperature sensor (such as a thermocouple or thermistor), a global positioning system (GPS), and/or an inertial measurement unit (IMU).

An electronics module (not shown) may also be included within the mat 1086. The electronics module can be communicatively coupled to one or more remote processing devices, e.g. using a wireless communication module (e.g., Bluetooth, Bluetooth Low-Energy, WiFi, ANT+ IEEE 802.11, etc.). The remote processing devices can be any type of processing device such as a personal computer, a tablet, and a mobile device (such as a smartphone, a smartwatch or a wristband) for example. The electronics module can also be communicatively coupled to a remote cloud server over, for example, a wide area network such as the Internet.

Each remote processing device and optional remote cloud server typically includes a processor, an output device (such as a display, speaker, or tactile feedback device), a user interface, an interface unit for communicating with other devices, Input/Output (I/O) hardware, a wireless unit (e.g. a radio that communicates using CDMA, GSM, GPRS or Bluetooth protocol according to standards such as IEEE 802.11a, 802.11b, 802.11g, or 802.11n), a power unit and a memory unit. The memory unit can include RAM, ROM, one or more hard drives, one or more flash drives or some other suitable data storage elements such as disk drives, etc.

A processor (included within the mat or as part of a remote processing device or cloud server) can be communicatively coupled to the one or more mat sensors and configured to receive sensor readings from the one or more mat sensors. The processor may also be configured to communicate with the circuit board 132, the remote processing device of the sensorized insoles, and/or the cloud server of the sensorized insoles. The processor can be configured to communicate with other devices wirelessly, e.g. using wireless communication protocols such as Bluetooth or Wi-Fi for example.

For clarity, in the below examples, the one or more mat sensors are force or pressure sensors.

Wherein the one or more mat sensors is a force sensor (e.g. a load cell) or pressure sensors, the processor can be configured to calibrate the sensors in the pressure sensor array 120 of the first and second sensorized insoles using the sensor readings from the force or pressure sensors in the mat. An example system for calibrating pressure sensors is described in U.S. provisional patent application No. 63/408,917 filed on Sep. 22, 2022, entitled "System and Method for Calibrating Force Sensors", the entirety of which is incorporated herein by reference.

Wherein the one or more mat sensors are pressure sensors, the processor may be configured to tune pressure estimates at non-sensor locations of the pressure sensor array 120 on the first and second sensorized insoles using the sensor readings from the pressure sensors in the mat. In some cases, pressure estimates may be tuned using the methods for synthesizing sensor data described in U.S. patent application Ser. No. 17/988,468 filed on Nov. 16, 2022, entitled "SYSTEM AND METHOD FOR SYNTHESIZING SENSOR READINGS", the entirety of which is incorporated herein by reference.

The processor may be configured to determine the weight or mass of a user standing on the mat from the force or pressure sensor readings. For example, a load cell may be embedded in the mat 1086 to measure the user's weight. The user can step onto the mat and wake up the mat sensors (i.e. activate the sensors after sleeping) to begin the measurement.

The mat 1086 may be used with a gaming system. The mat may provide additional data for the gaming system. For example, the gaming system may aid a user in losing weight. The mat 1086 may be used to measure body weight or mass and transmit the values to the sensorized insoles, the remote processing devices, and/or the cloud server. Actions, commands, or notifications may be triggered by the processor based on the weight and/or mass, such as a weight loss plan based on the user's current weight. For example, the gaming system may recommend certain activities to help the user accomplish their goal of losing weight, such as fitness-related games that can be played with the sensorized insoles. The mat 1086 may be used to measure a user's weight or mass over an extended period of time. The gaming system may in turn recommend more advanced games as the user loses weight or mass and may also present the user's weight loss progress through a visual display, an audio signal, and/or a haptic signal.

The memory unit may store weight and/or mass values for one user or multiple users. For example, the processor may attribute a first series of weights to a first user and a second series of weights to a second user in the memory unit. Users may be able to select their identity prior to weighing themselves to ensure that their weight or mass data is attributed to the correct user. Alternatively, the processor may be configured to detect weights and/or masses that are similar to previously stored values to determine which user is being weighed and store the new weights and/or masses in the designated storage location for the user.

The mat sensors may measure user mass and/or weight for other purposes. Body mass and/or weight are demographic data that may be used for gaming and non-gaming (e.g. athletic) purposes, such as for initial body assessments, for adjusting or creating avatars customized to a user (e.g. with similar body weight), as inputs for normalization factors in gaming, for calculating derivatives from the sensor data, for suggesting games to users, etc. In one example, a user may be asked to weigh themselves using the mat 1086 during initial start-up of the gaming system. The weight and/or mass of the user may be used to create an initial avatar matching the user's body weight, to create normalization factors for the user when competing against other users of differing weights or masses, to suggest games that match the user's fitness level and weight or mass, and to calculate a game score based on the user's performance in a game.

Additionally, the mat sensors may be used as a game controller along with the insoles. For example, in a baseball game, a user may be required to run to a base, which may be represented by the mat 1086. The mat sensor readings can be used to determine if the runner made it to the base before the other team reached it. In a music game, where sensor data is sonified, the data from the first and second sensorized insoles may be sonified according to a first and second musical instrument, and the data from the mat 1086 may be sonified according to a third musical instrument.

The processor may also be configured to restrict users from wirelessly charging the sensorized insoles and performing measurements with the mat sensors at the same time. For example, when the sensorized insoles are charging on the mat 1086, the mat sensors may be turned off to inhibit sensor measurements. If a user stands on the mat 1086 while the insoles are wirelessly charging on the mat 1086, a display screen may notify the user of an error and/or the system may stop wireless charging and sensor measurements until the error is no longer active.

The electronics module may be used to transmit data (e.g. weight, mass, or the mat sensor readings) from the mat 1086 to an output device. For example, a user may weigh themselves using the force or pressure sensors in the mat 1086. The weight, mass, and/or the mat sensor readings may then be transmitted to the output device and displayed for the user.

The weights, masses and/or the mat sensor readings (herein referred to as "outputs") may be displayed on the output device. The output device may be embedded in the mat 1086 (e.g. an electronic display on the edge of the mat), or it may be part of a remote processing device (e.g. a smartphone) or cloud server. The outputs may be presented as a visual display, an audio signal, a haptic signal, or any combination thereof. For example, a user may be able to interact with a visual display via an interactive medium (e.g. a touchscreen) on the output device. Examples of data visualizations that may be provided on the visual display based on the mat sensor readings include foot pressure maps to show the pressure distribution, foot pressure maps to show the movement of the center of pressure, pop-up notifications of errors in measurement, notifications of improper use, graphs showing changes in data over time, colour codes (e.g. different colour pop-ups for different weight measurements), graphs, statistics, graphic designs based on the readings and/or derived values from the mat sensors, or some combination thereof. The data visualizations may be altered or enabled or disabled by the user, with toggles, buttons, or other actions.

The electronics module and/or processor may also be configured to provide visual cues, auditory cues, haptic cues, or some combination thereof to instruct the user on how to operate the mat. For example, an LED on the mat may indicate when the user should step onto the mat 1086 to weigh themselves, and a visual display may show their weight. In another example, the mat 1086 may contain vibrotactile motors, which may generate a haptic cue once a measurement is complete, to indicate that the user should step off the mat 1086. Once the user has stepped off the mat 1086, and the mat sensors no longer detect pressure or force values, the output device in the mat 1086 may audibly announce the user's weight.

As previously described, other sensors may be included in the mat 1086 to measure other environmental or body health and wellness factors. For example, one or more mat sensors can be temperature sensors. In particular, the one or more temperature sensors may be used to measure body or environmental temperatures. In a first example, one or more temperature sensors (e.g. thermistors) may be included in a flexible printed circuit within the mat 1086. The one or more temperature sensors can detect temperature changes from the body. The temperature changes may be used in an algorithm that adjusts other sensor (e.g. pressure sensor) readings to account for temperature drift. Alternatively, the one or more temperature sensors may be used to measure the body temperature of users for health and gaming calculations (e.g. calorie burn calculations or to determine tissue damage in an area of the user's feet). In another example, the one or more temperature sensors may be affixed to the outside of the shoe or at other locations away from a user's body to determine the external temperature. The external temperature may be used in gaming to send safety messages and notifications to users (e.g. if the external temperature is hot, a user may receive a notification suggesting they hydrate more frequently). The external temperature may also be used to adjust health and gaming calculations and may be used to adjust the virtual environment in a game (e.g. if the external temperature is hot, the game may place the user in a virtual desert).

Alternatively, wherein the one or more mat sensors is a GPS, the wireless charging mat, the sensorized insoles, and/or a gaming system may be able to connect with other users in the same geographical area to improve social interactions within a game.

Figure 11:
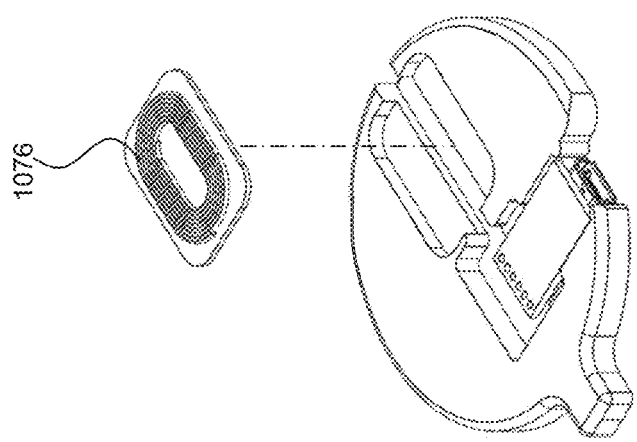
FIG. 11 is an exploded view of the receiver pod of the system of FIG. 10.

Referring to FIG. 11, the first receiver pod 1046 of the first sensorized insole of the system 1000 is shown. The first receiver pod 1046 is similar to the first receiver pod 146 of FIGS. 8 and 9; however the EMI shield 176 of FIGS. 8 and 9 is omitted, so that the receiver coil 1076 of the receiver pod 1046 can have a current induced therein from below. That is, whereas the first 1042 and second 1044 transmitter pods are positionable against the first foot-facing upper surface to wirelessly provide energy to the first receiver pod 1046 through the first insole bulk, the mat 1086 is positionable adjacent the first ground-facing lower surface to wirelessly provide energy to the first receiver pod 1042 through the first insole bulk. As mentioned above, for ease-of-use, the sensorized insoles may remain inside the shoes 1002, 1004 when being charged by the mat 1086; alternatively, the sensorized insoles can optionally be positioned with the ground-facing lower surface directly on the mat 1086.

While it is expected that in most cases, the mat 1086 will be used by placing the sensorized insoles on top of the mat 1086 (either directly or while inside the shoes 1002, 1004), it is also possible that the mat 1086 can be placed on top of the sensorized insoles, either adjacent the ground-facing lower surface or the foot-facing upper surface.

In alternative examples, the first receiver pod 1046 may include one or more movable EMI shields (not shown). For example, the first receiver pod 1046 may include a first EMI shield that automatically moves into position between the first wireless charging transmitter pod 1042 and the first receiver coil 1076 when the mat 1086 is being used to charge the sensorized insoles, and a second EMI shield that automatically moves into position between the first receiver coil 1076 and the mat coil (not shown) when the first and/or second transmitter pod 142, 144 is being used to charge the sensorized insoles. Alternatively, the first receiver pod 1046 may include a single EMI shield that can move between the above-mentioned positions.

Referring back to FIG. 10, in the example shown, the mat 1086 uses high frequency charging to charge the sensorized insoles. For example, a frequency of 10 MHz or greater may be used. As such, the shoes 1002, 1004 may be placed anywhere on the mat 1086 in order to charge the sensorized insoles, provided that the mat coil and the receiver coil 176 are at an angle that allows for energy transfer (e.g. parallel or substantially parallel). That is, the shoes need not be placed at a particular location on the mat 1086. Furthermore, the mat 1086 may be configured to detect the location and/or position of the shoes 1002, 1004 and/or sensorized insoles on the mat, and adjust its output accordingly. That is, the mat 1086 may emit an electromagnetic field of a frequency that is tuned to a position of the receiver pod 1076 with respect to mat 1086.

In examples where high frequency charging is used, the mat 1086 may include silicon and/or gallium nitride electronics.

In alternative examples, where low frequency charging is used, the mat bulk may include more than one mat coil. In some of these low frequency charging examples, where the placement of the shoes 1002, 1004 at a particular location is beneficial or required, the mat 1086 can include a guide for aiding the user in positioning the shoes 1002, 1004 at the particular location. For example, the mat 1086 can be printed with a visual target, such as an outline of a shoe.

In alternative examples, the receiver magnets and/or transmitter magnets may be optional. Referring back to FIG. 11, the first receiver pod 1046 further omits the receiver magnets, and the first transmitter pod 1042 and first receiver pod 1046 do not magnetically couple together. Instead, the user may simply place the first transmitter pod 1042 in the shoe 1002 and allow the first transmitter pod 1042 to rest at any location on the foot-facing upper surface, provided that the transmitter pods 1042, 1044 are at a sufficient angle with respect to the receiver coil (not shown) to induce a current in the receiver coil (e.g. parallel or substantially parallel). In this example, the first transmitter pod 1042 may optionally be configured to emit one or more stimuli to confirm to the user that the first transmitter pod 1042 has established a connection with the first receiver pod 1046. For example the first transmitter pod or the receiver pod 1042 may emit a visual stimulus, vibrational stimulus, tactile stimulus, audible stimulus, or any combination thereof.

In further examples, any of the transmitter pods 1042, 1044, the receiver pod 1042, and the mat 1086 may optionally be configured to emit one or more stimuli to confirm to the user that a wireless charging connection has been made. Any of the transmitter pods 1042, 1044, the receiver pod 1042, and the mat 1086 may emit a visual stimulus, vibrational stimulus, tactile stimulus, audible stimulus, or any combination thereof.

Notably, the system 1000 is configured to allow only one of the first transmitter pod 1042 and mat 1086 to provide energy to the first receiver pod 1046 at a given time. That is, if the first transmitter pod 1042 and the mat 1086 are both connected to an energy source (e.g. wall outlet 1066), and the user places the shoe 1002 on the mat 1086 and places the transmitter pod 1042 in the shoe 1002, the system will allow only one of the mat 1086 and the transmitter pod 1042 to charge the sensorized insole, and will prevent the other from charging the sensorized insole (i.e. will deactivate the other). For example, the system may detect which of the mat 1086 and the transmitter pod 1042 was the first to establish a connection with the sensorized insole, and allow whichever was the first to establish the connection to charge the sensorized insole, while preventing the other one from establishing a connection with the sensorized insole. Likewise, the system 1000 is configured to allow only one of the second transmitter pod 1044 and mat 1086 to provide energy to the second receiver pod at a given time.

In FIG. 10, the mat 1086 is shown as a generally flat rectangular body. In alternative examples, the mat can be another configuration (e.g. a body of any shape or thickness, provided that at least one of the shoes can rest on the body).

Optionally, the mat 1086 can be portable. This may allow a user to easily transport the mat 1086 for charging at different locations. For example, the mat 1086 may have a size and weight similar to a typical electronic scale.

The mat 1086 can also be configured to facilitate portability of the mat 1086 and/or the first and second sensorized insoles. For example, the mat 1086 may be foldable. This may allow the mat 1086 to convert between a more compact storage position (not shown) and an operational position (e.g. as shown in FIG. 10).

Optionally, the mat 1086 can include one or more receptacles. A receptacle can be defined to allow the first and second sensorized insoles to be received in the mat 1086 when the first and second sensorized insoles are not being worn by a user. Alternatively or in addition, the receptacle can allow additional components of the system (e.g. a wall adapter/plug, the wireless charging assembly 108, a power bank, etc.) to be stored in the mat 1086.

For example, the mat 1086 can include one or more receptacles or pockets. The pockets can be configured on the back or bottom surface of the mat 1086.

The mat 1086 can also include additional features to facilitate transportability. For example, the mat 1086 can include one or more fasteners usable to secure the mat 1086 in the storage position. The fastener can be provided in various forms, such as a removable adhesive, a hook and loop fastener, a clasp, a buckle, a string (e.g. that can be tied) and so forth.

The mat 1086 may also include one or more carrying supports such as a strap or handle to facilitate transportation by a user. The strap may be used to carry the mat 1086 in a storage position or even in an operational position.

In a further example, as an alternative to the mat 1086 or the charger 1040, or as an additional charging mode, a charging stand (not shown) may be provided. The charging stand can optionally charge the sensorized insoles from below (i.e. by positioning a charging element thereof adjacent the ground-facing lower surface) or from above (i.e. by positioning a charging element thereof adjacent the foot-facing upper surface).

In further examples, the receiver coil may be positioned outside of the heel area of the insole bulk. For example, the receiver coil may be positioned anywhere within the insole bulk or within the sole of the footwear of the user.

While the above description provides examples of one or more processes or apparatuses or compositions, it will be appreciated that other processes or apparatuses or compositions may be within the scope of the accompanying claims.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

We claim:

1. A footwear system comprising:
   at least a first sensorized insole comprising at least a first sensor;
   at least a first wireless charging transmitter pod for wirelessly providing energy to the first sensorized insole; and
   a wireless charging mat for wirelessly providing energy to the first sensorized insole.

2. The footwear system of claim 1, wherein the footwear system is configured to allow only one of the first wireless charging transmitter pod and the wireless charging mat to provide energy to the first sensorized insole at a given time.

3. The footwear system of claim 1, wherein
   the first sensorized insole has a first insole bulk having a first foot-facing upper surface and a first ground-facing lower surface;
   the first sensor is embedded in the first insole bulk for measuring a parameter of a user's first foot;
   at least a first battery is embedded in the first insole bulk for providing energy to the first sensor; and
   at least a first wireless charging receiver pod is embedded in the first insole bulk for wirelessly receiving energy from the first wireless charging transmitter pod and the wireless charging mat and providing energy to the first battery.

4. The footwear system of claim 3, wherein
   the first wireless charging transmitter pod is electrically connectable to an energy source for receiving energy from the energy source and wirelessly transmitting energy to the first wireless charging receiver pod; and
   the first wireless charging transmitter pod is positionable against the first foot-facing upper surface to wirelessly provide energy to the first wireless charging receiver pod through the first insole bulk.

5. The footwear system of claim 4, wherein
   the wireless charging mat is electrically connectable to the energy source for receiving energy from the energy source and wirelessly transmitting energy to the first wireless charging receiver pod; and
   the wireless charging mat is positionable adjacent the first ground-facing lower surface to wirelessly provide energy to the first wireless charging receiver pod through the first insole bulk.

6. The footwear system of claim 1, wherein the first wireless charging transmitter pod and the first sensorized insole are configured such that the first wireless charging transmitter pod wirelessly provides energy to the first sensorized insole while the first sensorized insole is received in a first shoe.

7. The footwear system of claim 6, wherein the first wireless charging transmitter pod is insertable through a foot-receiving opening of the first shoe to couple to the first sensorized insole.

8. The footwear system of claim 1, wherein the wireless charging mat and the first sensorized insole are configured such that the wireless charging mat wirelessly provides energy to the first sensorized insole while the first sensorized insole is received in a first shoe.

9. The footwear system of claim 8, wherein the first shoe is restable on the wireless charging mat, and wherein the wireless charging mat is configured to provide energy to the first sensorized insole through a sole of the first shoe.

10. The footwear system of claim 1, further comprising
    at least a second sensorized insole comprising at least a second sensor; and
    at least a second wireless charging transmitter pod for wirelessly providing energy to the second sensorized insole;
    wherein the wireless charging mat is configured to wirelessly provide energy to the second sensorized insole.

11. A method for charging at least a first sensorized insole, comprising:
    a. with the first sensorized insole received in a first shoe,
       i. placing a first wireless charging transmitter pod into the first shoe; and/or
       ii. placing the first shoe on a wireless charging mat; and b. with the first sensorized insole received in the first shoe, transferring energy from the first wireless charging transmitter pod or the wireless charging mat to the first sensorized insole.

12. The method of claim 11, wherein step i. comprises positioning the first wireless charging transmitter pod against a first foot-facing upper surface of the first sensorized insole.

13. The method of claim 12, wherein step i. comprises inserting the first wireless charging transmitter pod through a foot-receiving opening of the first shoe.

14. The method of claim 11, wherein step ii. comprises positioning a first ground-facing lower surface of the first sensorized insole adjacent the wireless charging mat.

15. The method of claim 14, wherein step b. comprises transferring energy through a sole of the shoe.

16. The method of claim 11, wherein
step a. comprises placing the first wireless charging transmitter pod into the first shoe and placing the first shoe on a wireless charging mat; and
step b. comprises transferring energy from only one of the first wireless charging transmitter pod and the wireless charging mat to the first sensorized insole.

17. The method of claim 11, further comprising:
c. with a second sensorized insole received in a second shoe,
   iii. placing a second wireless charging transmitter pod into the second shoe; and/or
   iv. placing the second shoe on the wireless charging mat; and
d. with the second sensorized insole received in the second shoe, transferring energy from the second wireless charging transmitter pod or the wireless charging mat to the second sensorized insole.

18. The method of claim 17, wherein step d. is carried out concurrently with step b.

19. A footwear system comprising:
a first shoe;
a first sensorized insole received in the first shoe and comprising a first sensor;
wherein the first sensorized insole is configured to receive energy while received in the first shoe, and is configured to receive energy from a first wireless charging transmitter pod and from a wireless charging mat.

20. The footwear system of claim 19, wherein the first sensorized insole is configured to allow only one of the first wireless charging transmitter pod and the wireless charging mat to provide energy to the first sensorized insole at a given time.

* * * * *